US012632729B2

(12) United States Patent
Lu et al.

(10) Patent No.: US 12,632,729 B2
(45) Date of Patent: May 19, 2026

(54) BILEVEL OPTIMIZATION BASED DECENTRALIZED FRAMEWORK FOR PERSONALIZED CLIENT LEARNING

(71) Applicant: International Business Machines Corporation, Armonk, NY (US)

(72) Inventors: Songtao Lu, White Plains, NY (US); Xiaodong Cui, Chappaqua, NY (US); Mark S. Squillante, Greenwich, CT (US); Brian E. D. Kingsbury, Cortlandt Manor, NY (US); Lior Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 17/943,839

(22) Filed: Sep. 13, 2022

(65) Prior Publication Data

US 2024/0095515 A1    Mar. 21, 2024

(51) Int. Cl.
*G06N 3/08* (2023.01)

(52) U.S. Cl.
CPC ..................................... *G06N 3/08* (2013.01)

(58) Field of Classification Search
CPC .......... G06N 3/08; G06N 3/045; G06N 20/00; G06F 17/11; G06F 2217/08
See application file for complete search history.

(56) References Cited

U.S. PATENT DOCUMENTS

| 2019/0332955 A1 | 10/2019 | Manamohan et al. |
| 2020/0175370 A1 | 6/2020 | Zhang et al. |
| 2020/0272934 A1 | 8/2020 | Manamohan et al. |
| 2022/0027796 A1 | 1/2022 | Zhang et al. |
| 2022/0114475 A1 | 4/2022 | Zhu et al. |

FOREIGN PATENT DOCUMENTS

AU        2020101959 A4    10/2020

OTHER PUBLICATIONS

Chen, Xuxing, Minhui Huang, and Shiqian Ma. "Decentralized Bilevel Optimization." arXiv preprint arXiv:2206.05670 (2022). (Year: 2022).*
Gratton, Cristiano, et al. "Decentralized Optimization with Distributed Features and Non-Smooth Objective Functions." arXiv preprint arXiv:2208.11224 (2022). (Year: 2022).*
Pei, Hongbin, et al. "Geom-gcn: Geometric graph convolutional networks." arXiv preprint arXiv:2002.05287 (2020). (Year: 2020).*

(Continued)

*Primary Examiner* — Matthew Ell
(74) *Attorney, Agent, or Firm* — Robert D. Bean

(57)        ABSTRACT

Decentralized bilevel optimization techniques for personalized learning over a heterogenous network are provided. In one aspect, a decentralized learning system includes: a distributed machine learning network with multiple nodes, and datasets associated with the nodes; and a bilevel learning structure at each of the nodes for optimizing one or more features from each of the datasets using a decentralized bilevel optimization solver, while maintaining distinct features from each of the datasets. A method for decentralized learning is also provided.

13 Claims, 11 Drawing Sheets

(56) References Cited

OTHER PUBLICATIONS

Yang, Shuoguang, Xuezhou Zhang, and Mengdi Wang. "Decentralized gossip-based stochastic bilevel optimization over communication networks." Advances in neural information processing systems 35 (2022): 238-252. (Year: 2022).*

Lu et al., "Decentralized Bilevel Optimization for Personalized Client Learning," ICASSP 2022—2022 IEEE International Conference on Acoustics, Speech and Signal Processing (ICASSP), May 23-27, 2022 (5 pages)—Grace Period Disclosure.

S. Ghadimi et al., "Approximation Methods for Bilevel Programming," arXiv:1802.02246v1 (Feb. 2018) (27 pages).

Ji et al., "Bilevel Optimization: Convergence Analysis and Enhanced Design," Proceedings of the 38th International Conference on Machine Learning, PMLR 139, 2021 (11 pages).

Hong et al., "A Two-Timescale Stochastic Algorithm Framework for Bilevel Optimization: Complexity Analysis and Application to Actor-Critic," arXiv:2007.05170v4 (Jun. 2022) (40 pages).

Chen et al., "A Single-Timescale Method for Stochastic Bilevel Optimization," arXiV:2102.04671v4 (Mar. 2022) (23 pages).

Chen et al., "Tighter Analysis of Alternating Stochastic Gradient Method for Stochastic Nested Problems," arXiv:2106.13781v1 (Jun. 2021) (35 pages).

Khanduri et al., "A Near-Optimal Algorithm for Stochastic Bilevel Optimization via Double-Momentum," arXiv:2102.07367v3 (Jun. 2021) (36 pages).

Yang et al., "Provably Faster Algorithms for Bilevel Optimization," arXiv:2106.04692v2 (Dec. 2021) (34 pages).

Lian et al., "Can Decentralized Algorithms Outperform Centralized Algorithms A Case Study for Decentralized Parallel Stochastic Gradient Descent," arXiC:1705.09056v5 (Sep. 2017) (33 pages).

Lu et al., "GNSD: a Gradient-Tracking Based Nonconvex Stochastic Algorithm for Decentralized Optimization," IEEE Data Science Workshop (DSW), pp. 315-321, Jun. 2019.

Tang et al., "D2: Decentralized Training over Decentralized Data," arXiv:1803.07068v2 (Apr. 2018) (25 pages).

Lu et al., "Linearized ADMM Converges to Second-Order Stationary Points for Non-Convex Problems," IEEE Transactions on Signal Processing, vol. 69, pp. 4859-4874 (Aug. 2021).

Gao et al., "A Graph Neural Network Based Decentralized Learning Scheme," Sensors, 22, 1030 (Jan. 2022) (18 pages).

Hu et al., "Stochastic Distributed Optimization for Machine Learning from Decentralized Features," arXiv:1812.06415v1 (Dec. 2018) (9 pages).

Cui et al., "Federated Acoustic Modelling for Automatic Speech Recognition," arXiv:2102.04429v1 (Feb. 2021) (5 pages).

X. Chen et al., "Decentralized Bilevel Optimization," arXiv:2206.05670v1 (Jun. 2022) (40 pages).

Finn et al., "Model-Agnostic Meta-Learning for Fast Adaptation of Deep Networks," Proceedings of the 34th International Conference on Machine Learning, Sydney, Australia, PMLR 70, 2017 (10 pages).

Mell et al., "The NIST Definition of Cloud Computing," NIST Special Publication 800-145, Sep. 2011 (7 pages).

LeCun et al., "Gradient-Based Learning Applied to Document Recognition," Proc. of the IEEE (Nov. 1998) (46 pages).

* cited by examiner

300

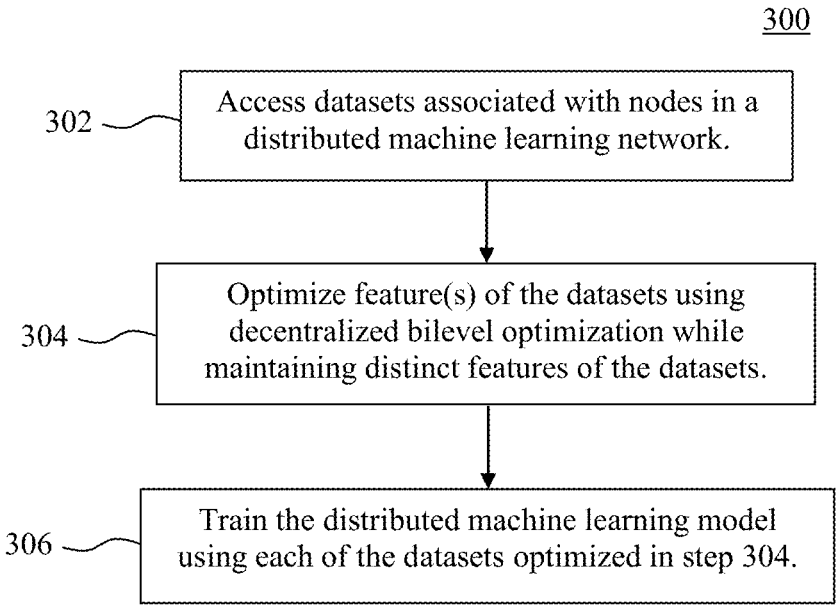

302 — Access datasets associated with nodes in a distributed machine learning network.

304 — Optimize feature(s) of the datasets using decentralized bilevel optimization while maintaining distinct features of the datasets.

306 — Train the distributed machine learning model using each of the datasets optimized in step 304.

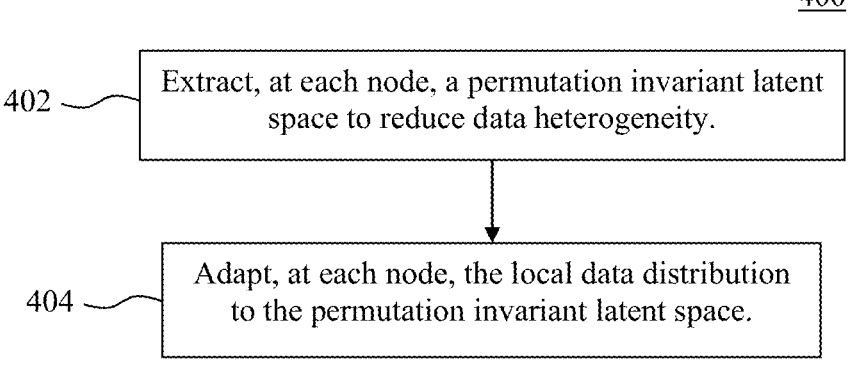

402 — Extract, at each node, a permutation invariant latent space to reduce data heterogeneity.

404 — Adapt, at each node, the local data distribution to the permutation invariant latent space.

| Stochastic Primal-dual Decentralized algorithm for Bilevel Optimization (SPDB) |
|---|

Initialization: $x^0, y^0, \alpha, \beta$ for $r = 1, \ldots, T$ do

$\quad y_i^{r+1} = y_i^r - \beta h_{g,i}^r, \forall i,$ $\qquad\qquad\qquad$ ▷ adaptation step $\quad x_i^{r+1} = \sum_{j \in \mathcal{N}_i} W_{ij}\left(2x_j^r - x_j^{r-1}\right) - \frac{1}{\alpha}\left(h_{f,i}^r - h_{f,i}^{r-1}\right)$ end for

FIG. 5 concensus    adaptation

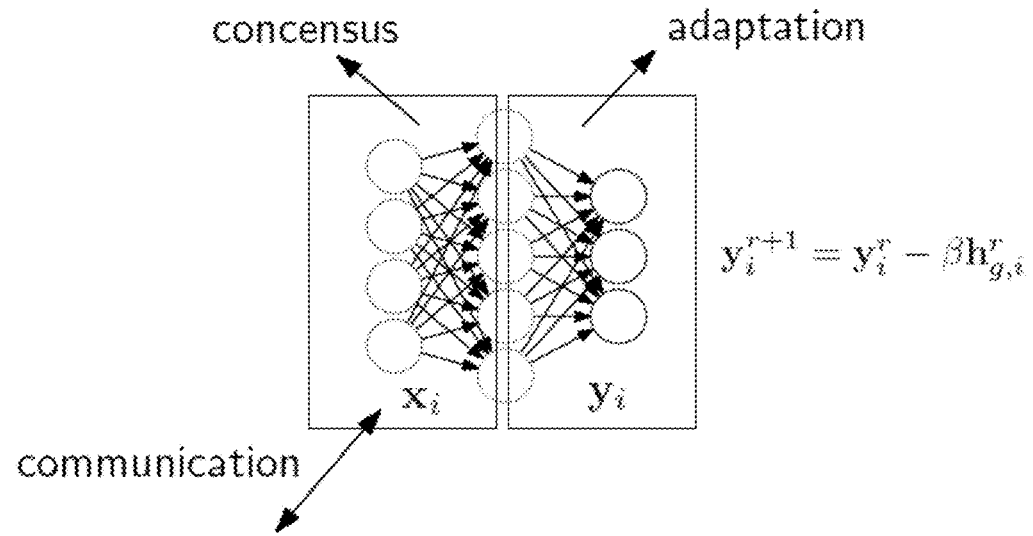

$$y_i^{r+1} = y_i^r - \beta h_{g,i}^r$$

communication $x_j$ ◄— neural net parameter of node $i$'s neighbor $$x_i^{r+1} = \sum_{j \in \mathcal{N}_i} W_{ij}\left(2x_j^r - x_j^{r-1}\right) - \frac{1}{\alpha}\left(h_{f,i}^r - h_{f,i}^{r-1}\right)$$

FIG. 6

Training (limited data)

Testing (limited data)

Training (full dataset)

Testing (full dataset)

number of epochs

Learner 1

Learner 4

|  | S1 | S2 | S3 | S4 |
| --- | --- | --- | --- | --- |
| DSGD (Baseline) | 22.0 | 12.6 | 22.8 | 21.3 |
| SPD/D$^2$ | 21.9 | 12.5 | 22.3 | 20.5 |
| SPDB (PCL) | 21.4 | 12.4 | 19.9 | 18.7 |

100

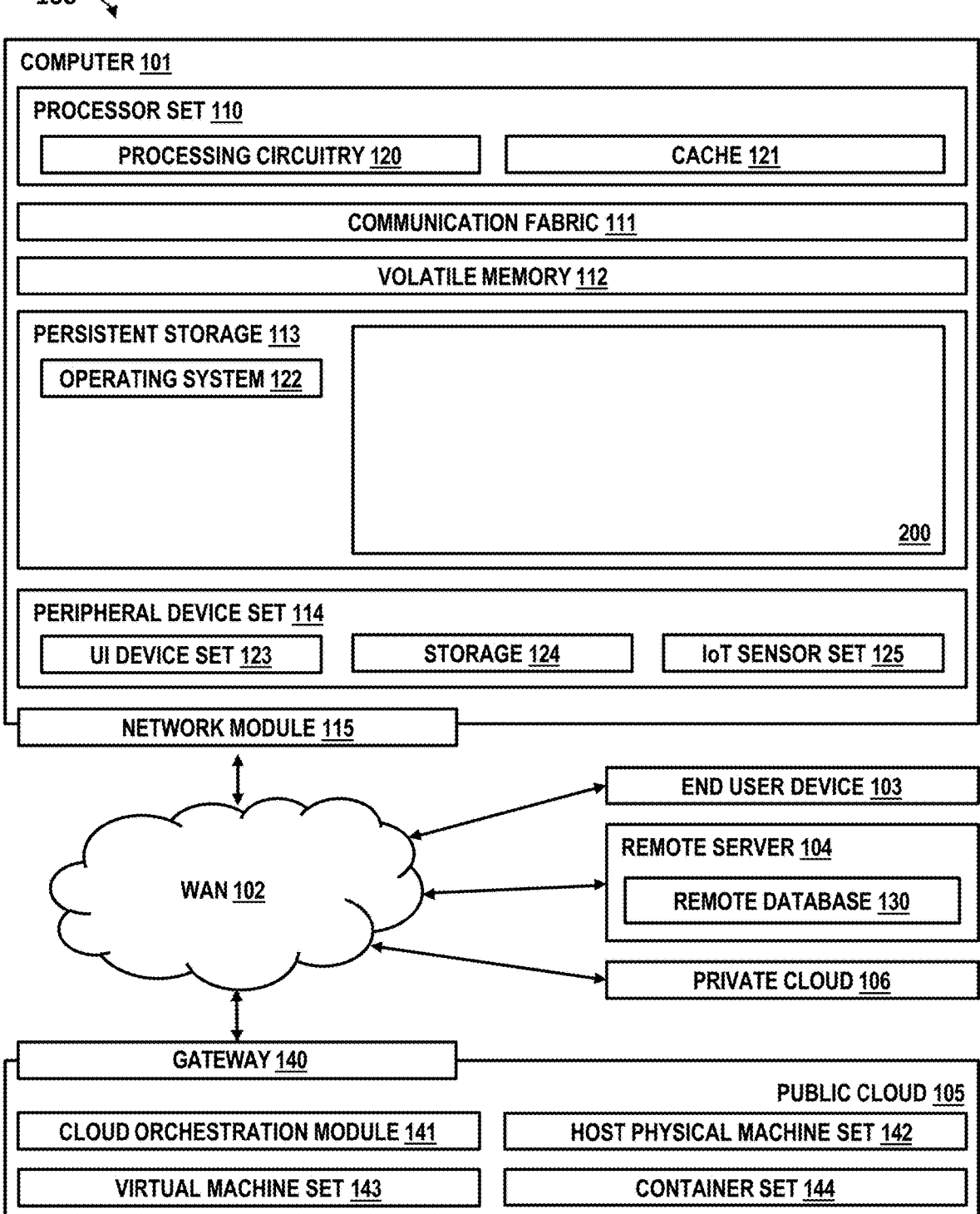

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 10

BILEVEL OPTIMIZATION BASED DECENTRALIZED FRAMEWORK FOR PERSONALIZED CLIENT LEARNING

STATEMENT REGARDING PRIOR DISCLOSURES BY THE INVENTOR OR A JOINT INVENTOR

The following disclosure(s) arc submitted under 35 U.S.C. 102(b)(1)(A):

DISCLOSURE(S)

"Decentralized Bilevel Optimization for Personalized Client Learning," Songtao Lu, Xiaodong Cui, Mark S. Squillante, Brian Kingsbury, Lior Horesh, ICASSP 2022-2022 IEEE International Conference on Acoustics, Speech and Signal Processing (ICASSP), 23-27 May 2022 (5 pages) (publicly available on 27 Apr. 2022).

FIELD OF THE INVENTION

The present invention relates to distributed machine learning, and more particularly, to decentralized bilevel optimization for personalized learning over a heterogenous network.

BACKGROUND OF THE INVENTION

Deep learning is applied for a variety of different applications. One such application is automatic speech recognition where spoken language is translated into text, which enables a user to interact with a computing device without the user having to input text.

Deep learning neural networks trained in a supervised manner on large datasets can make remarkably accurate predictions. However, when data samples are limited or there are multiple training tasks, data heterogeneity becomes one of the major barriers that prevents an increase in testing and validation accuracy.

As such, there is a need for learning algorithms that can balance the personalized data structure of each task and the permutation-invariant latent space/features among all of the tasks. Some approaches leverage the similarities among tasks over heterogenous datasets, for example, by building two levels of learners, i.e., a meta-learner and a task-specific learner, which respectively minimize the task-averaged loss and individual loss of each task.

However, these bilevel approaches are centralized. Thus, when multiple computing resources/clients are connected through communication channels, existing decentralized optimization algorithms are not equipped to solve bilevel programming problems over a network, especially when the programming problems are different amongst the clients.

Accordingly, decentralized bilevel optimization techniques over heterogeneous networks that take into account local client data structures for personalized client learning would be desirable.

SUMMARY OF THE INVENTION

The present invention provides decentralized bilevel optimization techniques for personalized learning over a heterogenous network. In one aspect of the invention, a decentralized learning system is provided. The decentralized learning system includes: a distributed machine learning network with multiple nodes, and datasets associated with the nodes; and a bilevel learning structure at each of the nodes for optimizing one or more features from each of the datasets using a decentralized bilevel optimization solver, while maintaining distinct features from each of the datasets.

In another aspect of the invention, a method for decentralized learning is provided. The method includes: accessing datasets associated with nodes in a distributed machine learning network; optimizing one or more features from each of the datasets using a decentralized bilevel optimization solver, where distinct features from each of the datasets are maintained during the optimizing; and training a distributed machine learning model using each of the datasets which includes the one or more features that have been optimized.

A more complete understanding of the present invention, as well as further features and advantages of the present invention, will be obtained by reference to the following detailed description and drawings.

BRIEF DESCRIPTION OF THE DRAWINGS

FIG. 3 is a diagram illustrating an exemplary methodology for decentralized learning of a distributed machine learning model according to an embodiment of the present invention;

FIG. 4 is a diagram illustrating an exemplary methodology for optimizing features from unique datasets at the nodes in a distributed machine learning network using a decentralized bilevel optimization solver at each of the nodes according to an embodiment of the present invention;

FIG. 5 is a diagram illustrating an exemplary stochastic primal-dual decentralized algorithm for bilevel optimization according to an embodiment of the present invention;

FIG. 6 is a schematic diagram illustrating an exemplary implementation of the present stochastic primal-dual decentralized algorithm for bilevel optimization at one of the local agents/learners according to an embodiment of the present invention;

FIG. 10 is a diagram illustrating an exemplary computing environment according to an embodiment of the present invention.

DETAILED DESCRIPTION OF PREFERRED EMBODIMENTS

Decentralized optimization has advanced machine learning significantly over the past few years. With decentralized optimization, data is distributed to multiple networked computing resources (also referred to herein as "clients" or "agents"). Each agent has access only to the data related to their particular computing task. However, the agents are connected through communication channels, and thus work collectively at solving a finite-sum problem. By comparison with centralized optimization schemes, decentralized optimization does not employ a central server to collect results from the agents.

However, as highlighted above, heterogeneous data distributions at different nodes/locations provide a major obstacle for decentralized optimization. See, for example, FIG. 1 which is a schematic diagram of an exemplary distributed machine learning network 10 that includes multiple agents (labeled in FIG. 1 as "Node 1," "Node 2," "Node 3," etc.) connected through communication channels (depicted using dashed lines).

Figure 1:
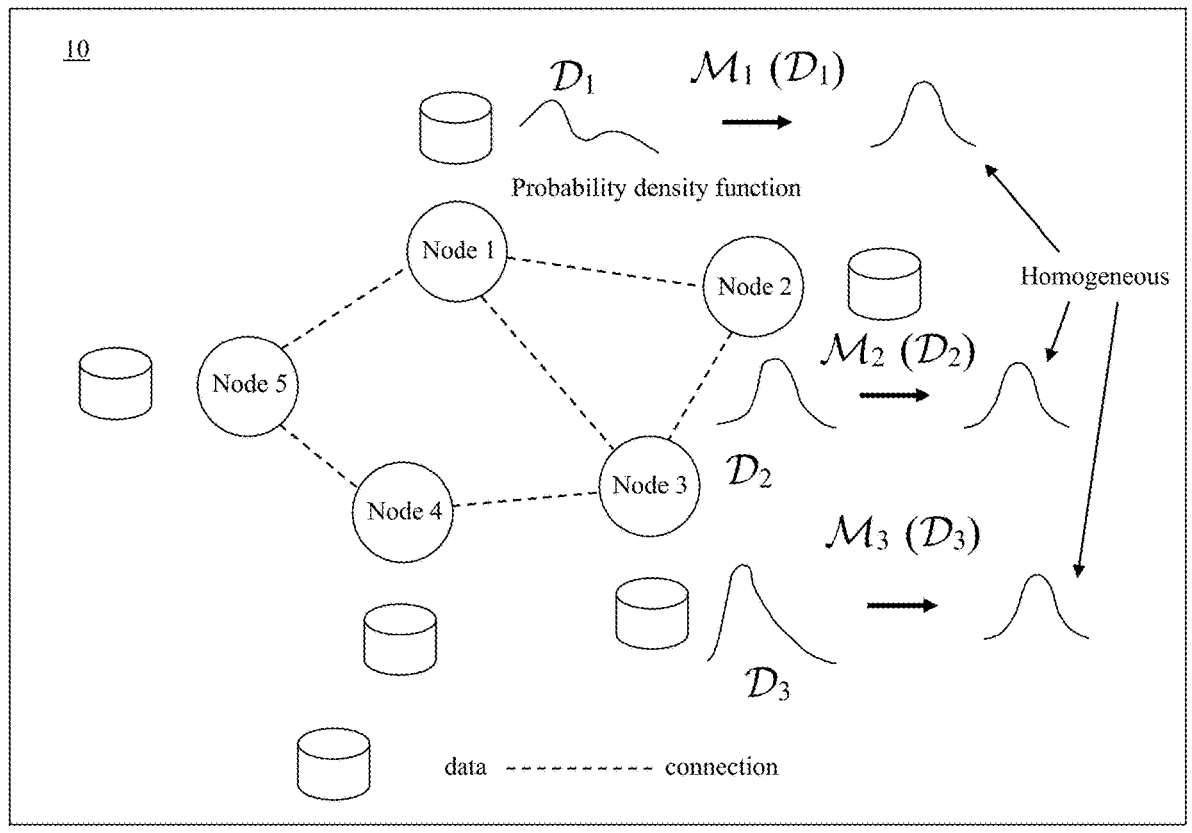
FIG. 1 is a schematic diagram of an exemplary distributed machine learning network having multiple agents/nodes each with a data distribution that is different from that of its neighboring nodes, and a mapping having been used to observe the distributions at some latent space where they are all homogeneous according to an embodiment of the present invention.

In this example, each node has a data distribution (probability density function) that is different, i.e., heterogeneous, from its neighboring nodes. For instance, as shown in FIG. 1, the data distribution $\mathcal{D}_1$ at Node 1 is different from the data distribution $\mathcal{D}_2$ at Node 2, and the data distributions $\mathcal{D}_1$ and $\mathcal{D}_2$ at Node 1 and Node 2, respectively, are different from the data distribution $\mathcal{D}_3$ at Node 3. Given this scenario, most consensus-based decentralized algorithms would tend to ignore distinctive features of these local data samples.

Advantageously, provided herein is a stochastic primal-dual algorithm for solving decentralized bilevel optimization problems and building a general decentralized training framework for personalized client learning. Bilevel optimization is a problem-solving framework in which two (upper and lower) levels of optimization problems need to be solved with coupled variables in both the upper and lower levels. For instance, an objective in the upper level is minimized using a constraint provided by another optimization problem in the lower level. As an application of decentralized bilevel optimization, personalized client learning aims to separate the shared feature space and the private space so that the training process can be accelerated by leveraging the data over the network without loss of personalized local features (e.g., local client data structures are taken into account).

For instance, as shown in FIG. 1 and as will be described in detail below, a transform function with a mapping $\mathcal{M}_i(\bullet)$ is used to canonicalize data heterogeneity by extracting a permutation invariant latent space where the distributions $\mathcal{D}_1$, $\mathcal{D}_2$ and $\mathcal{D}_3$ are all homogeneous. See, e.g., $\mathcal{M}_1(\mathcal{D}_1)$, $\mathcal{M}_2(\mathcal{D}_2)$ and $\mathcal{M}_3(\mathcal{D}_3)$, respectively. Doing so, advantageously enables the utilization of all data samples in the network.

The present personalized client learning scheme for training over heterogeneous networks can be formulated as follows. Similar to the distributed machine learning network 10 of FIG. 1, it is assumed that there are n learners connected through a graph denoted by $\mathcal{G} = \{\mathcal{V}, \varepsilon\}$, where each node i has a set of data samples following a distribution $\mathcal{D}_1$. It is notable that, in the context of personalized client learning, the agents/nodes at the various locations may also be referred to herein as "learners." As such, the terms "client," "agent," "node," "location," and "learner" are being used interchangeably herein.

The goal of the networked agents/learners is to jointly minimize the following (possibly nonconvex) optimization problem:

$$\min_{\{w_i, \forall i\}} \frac{1}{n} \sum_{i=1}^{n} \mathbb{E}_{\xi \sim \mathcal{D}_i}[l(w_i, \mathcal{T}_i^*(w_i; \xi))], \text{ s.t. } w_i = w_j, \forall j \in \mathcal{N}_i,$$

where $I(\bullet)$ denotes a general loss function, $w_i$ is the model weight parameter at each node, $\mathcal{N}_i$ denotes the neighboring learners of node i, and the transform function:

$$\mathcal{T}_i^*(w_i; \xi) = \operatorname{argmin}_{\mathcal{M}_i} l(w_i, \mathcal{M}_i(\xi)), \xi \sim \mathcal{D}_i$$

extracts and processes the distinct features (relative to the rest of the nodes) to canonicalize data heterogeneity as highlighted above. Namely, a feature is distinct if it is unique to the dataset at a particular node, as compared to the other nodes. In practice, mapping $\mathcal{M}_i(\bullet)$ is parameterized either in a linear or nonlinear way. Thus, as will be described in detail below, the n agents/learners are collectively learning a distributed machine learning model (decentralized optimization) which involves two levels of learning at each node (bilevel optimization), i.e., an upper-level learning system and a lower-level learning system. The upper-level learning system (e.g., a global consensus model implemented at each node) extracts a permutation invariant latent space y thereby reducing variance of data through the aggregation process, such that all data samples in the network can be utilized (for personalized client learning). The lower-level learning system (e.g., an individual learning model implemented at each node) adapts the individual data distributions to the permutation invariant latent space. The advantages of such a framework are that this structure canonicalizes the local data structure, so that the heterogeneity of the network is removed for the consensus process and the generalization performance of the full model is improved.

Figure 2:
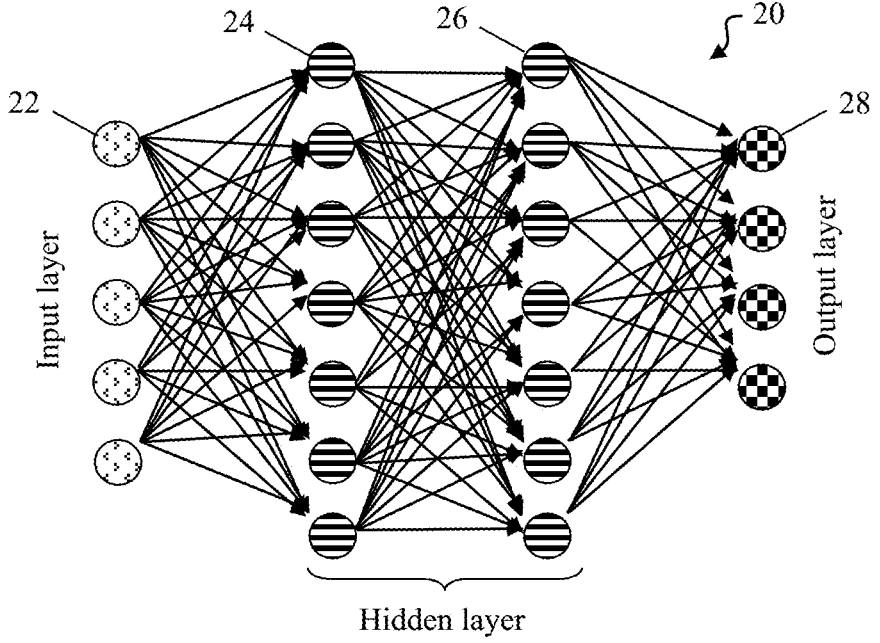
FIG. 2 is a schematic diagram illustrating an exemplary neural network according to an embodiment of the present invention.

As shown in FIG. 2, the neural network 20 for each agent/learner includes a plurality of interconnected processor elements 22, 24/26 and 28 that form an input layer, at least one hidden layer, and an output layer, respectively, of the neural network 20. In machine learning and cognitive science, neural networks are a family of statistical learning models inspired by the biological neural networks of animals, and in particular the brain. Neural networks may be used to estimate or approximate systems and cognitive functions that depend on a large number of inputs and weights of the connections which are generally unknown. Neural networks are often embodied as so-called "neuromorphic" systems of interconnected processor elements which act as simulated "neurons" that exchange "messages" between each other in the form of electronic signals.

Given the above overview, FIG. 3 is a diagram illustrating an exemplary methodology 300 for decentralized learning of a distributed machine learning model in accordance with the present techniques. By way of example only, the distributed machine learning model can be embodied in the neural network 20 of each agent/learner. See FIG. 2, described above.

According to an exemplary embodiment, the steps of methodology 300 are performed in conjunction with a distributed machine learning network such as distributed machine learning network 10 of FIG. 1. In step 302, multiple unique datasets are accessed, where each of the datasets is associated with a different node (e.g., Node 1, Node 2, Node 3, etc.) in the distributed machine learning network. According to an exemplary embodiment, the datasets accessed in step 302 are heterogeneous. Namely, as described above, this can mean that the datasets have data distributions (e.g., $\mathcal{D}_1$, $\mathcal{M}_2$, $\mathcal{M}_3$, etc.) that are different amongst neighboring nodes. For instance, using distributed machine learning network 10 of FIG. 1 as a non-limiting example, the data distribution $\mathcal{D}_1$ at Node 1 is different from the data distribution $\mathcal{D}_2$ at Node 2, and the data distributions $\mathcal{D}_1$ and $\mathcal{D}_2$ at Node 1 and Node 2, respectively, are different from the data distribution $\mathcal{D}_3$ at Node 3. As highlighted above, the present techniques advantageously canonicalize heterogeneity in the datasets, thereby enabling all data samples in the network to be utilized.

Namely, in step 304, features from each of the datasets accessed in step 302 are optimized using a decentralized bilevel optimization problem. Generally, these features can be the variables or some other attributes in the datasets. For instance, a common practice is to pick a subset of variables that can be used as a good predictor for a machine learning model. Advantageously, the distinct features from each of the datasets are maintained during this optimization process. According to an exemplary embodiment, the optimization in step 304 is performed using the following linearly constrained bilevel optimization problem:

$$\min_{x \in \square^n} \frac{1}{n} \sum_{i=1}^{n} E_{\xi \in D_i^{(u)}}[f_i(x_i, y_i^*(x_i); \xi)] \tag{1a}$$

$$\text{s.t. } Ax = 0, \ y_i^*(x_i) = \arg\min_{y_i \in \square^m} E_{\zeta \in D_i^{(l)}}[g_i(x_i, y_i; \zeta)], \tag{1b}$$

$$\text{where } f_i(x_i, y_i^*(x_i)) \square E_{\xi \in D_i^{(u)}} f_i(x_i, y_i^*(x_i); \xi)$$

is a smooth loss function (possibly nonconvex), $D_i^{(u)}$ and $D_i^{(l)}$ denote the local data distributions at the upper and lower levels of this optimization problem, respectively, $g_i(\bullet)$ denotes the lower-level loss function at node i, x $\mathbb{R}^{|\mathcal{E}|\times n}$ $[x_1, \ldots, x_n]^T$, and $A \in \mathbb{R}^{|\mathcal{E}| \times n |E| \times n}$ represents an incidence matrix. Without loss of generality, it is being assumed that the problem dimension is 1 in order to simplify the notation.

For instance, referring briefly to methodology 400 in FIG. 4, Equations 1a and 1b represent the two levels (upper and lower, respectively) of learning that are performed by a decentralized bilevel optimization solver at each of the nodes (e.g., Node 1, Node 2, Node 3, etc.) in the distributed machine learning network. A solver is mathematical software implemented at each of the nodes that, in this case, solves the bilevel optimization problem set forth in Equations 1a and 1*b* above. More specifically, in step 402, using Equation 1a the upper-level learning structure at each node extracts a permutation invariant latent space to reduce data heterogeneity, thereby enabling the utilization of all data samples in the network with the benefit of reduced variance. In step 404, using Equation 1b the lower-level learning structure at each node adapts the local/individual data distributions at each of the nodes (e.g., $\mathcal{D}_1$, $\mathcal{D}_2$, $\mathcal{D}_3$, etc.) to the permutation invariant latent space.

Referring back to methodology 300 of FIG. 3, in step 306 the distributed machine learning model is trained using each of the datasets having the features optimized in step 304. As provided above, the distinct features from each of the datasets have been maintained. By contrast, as highlighted above, most consensus-based decentralized algorithms would ignore distinctive features of local data samples.

Also provided herein is a stochastic primal-dual framework that can be implemented in the present system to ensure that the distributed machine learning model is obtained efficiently and with theoretical guarantees. A primal-dual method is used in designing algorithms for combinatorial optimization problems.

Towards this end, an augmented Lagrangian is first introduced:

$$\mathcal{L}_\rho(x, \lambda) = n^{-1} 1^T f(x, y^*(x)) + \langle \lambda, Ax \rangle + \frac{\rho}{2} \|Ax\|^2, \tag{2}$$

$$\text{where } f(x, y^*(x)) \triangleq [f_1(x_1, y_1^*(x_1)), \ldots, f_n(x_n, y_n^*(x_n))]^T,$$

$\lambda \in \mathbb{R}^n$ denotes the dual variable that enforces the consensus of the primal variables, i.e., $A_x$, and $\rho > 0$ is the penalty parameter of the augmented term.

For the stochastic primal-dual structure, one can define $$g_i(x_i, y_i) \triangleq \mathbb{E}_{\zeta \in \mathcal{D}_i^{(l)}}[g_i(x_i, y_i; \zeta)],$$

$\forall i$ and define $\nabla_{x_i} f(x_i, y_i)$ to be the vector obtained by replacing $y_i^*(x)$ in $\nabla_{x_i} f_i(x_i, y_i^*(x_i))$ by $y_i$. When $g_i(\bullet)$ is strongly convex $$\nabla_{x_i} f(x_i, y_i) \triangleq \nabla_{x_i} f(x_i, y_i) - \nabla_{x_i y_i}^2 g_i(x_i, y_i) [\nabla_{y_i y_i}^2 g_i(x_i, y_i)]^{-1} \nabla_{y_i} f_i(x_i, y_i).$$

The proposed stochastic primal-dual algorithm for solving Equation 1 is:

$$y^{r+1} = y^r - \beta h_g^r, \tag{3a}$$

$$x^{r+1} = \arg\min_x \langle h_f^r + A^T(\lambda^r + \rho Ax^r), x - x^r \rangle + \frac{\alpha}{2} \|x - x^r\|^2, \tag{3b}$$

$$\lambda^{r+1} = \lambda^r + \rho Ax^{r+1},$$

where r indexes iterations, $$y \triangleq [y_1, \dots, y_n]^T, g(x, y) \triangleq [g_1(x_1, y_1), \dots, g_n(x_n, y_n)]^T,$$

$$h_g^r \text{ and } h_f^r$$

are stochastic estimates of $\nabla_y g(x^r, y^r)$ and $n^1 \nabla_x f(x^r, y^{r+1})$, $1/\alpha$ and $\rho > 0$, respectively, denote the step-sizes of the primal and dual updates, and $\beta$ is the step-size of the lower-level iterates' update. It is notable that Equation 1 refers to Equations 1a and 1b (see above) as a whole in the sense that Equation 1 includes both the objective function and constraints together.

As the objective function in the x sub-problem is quadratic, a closed-form expression for the x update can be obtained as:

$$x^{r+1} = x^r - \frac{1}{\alpha}\left(h_f^r + A^T \lambda^r + \rho A^T A x^r\right) \qquad (4)$$

Then, subtracting Equation 4 with the same from its previous iteration, the following update of x can be obtained after using Equation 3b:

$$x^{r+1} = 2Wx^r - Wx^{r-1} - \frac{1}{\alpha}\left(h_f^r - h_f^{r-1}\right), \qquad (5)$$

where $W \triangleq I - \rho A^T A/\alpha$. Therefore, the above primal and dual updates can be merged into a single step.

A detailed implementation of the present stochastic primal-dual decentralized algorithm for bilevel optimization (SPDB) 500 from a local view is shown in FIG. 5. In FIG. 5, $$h_{g,i}^r, h_{f,i}^r,$$

$\forall i$ denote the gradient estimates of $$\nabla_{y_i} g_i(x_i^r, y_i^r), n^{-1}\nabla_{x_i} f_i(x_i^r, y_i^{r+1}),$$

$\forall_i$, and $W_{ij}$ denotes the entry at the ith row and jth column of matrix W.

It is notable that, when there is no lower-level optimization problem, the present stochastic primal-dual decentralized algorithm for bilevel optimization 500 reduces to a stochastic primal-dual decentralized (SPD) algorithm, however with a different ordering of the local update and weights aggregation from neighbors. When full gradient is used, the stochastic primal-dual decentralized (SPD) algorithm reduces to a deterministic gradient primal-dual algorithm. It is also notable that the present stochastic primal-dual decentralized algorithm for bilevel optimization 500 (like SPD) only needs one communication round per iteration, which is half that of gradient tracking technique algorithms.

FIG. 6 is a schematic diagram illustrating an exemplary implementation of the present stochastic primal-dual decentralized algorithm for bilevel optimization 500 at one of the local agents/learners. For instance, as shown in FIG. 6, neural network decomposition over a consensus network involves communication of the neural network parameters amongst neighboring nodes, a global consensus model to canonicalize the data heterogeneity, and an individual learning model to adapt the local/individual data distributions.

As provided above, the present stochastic primal-dual decentralized algorithm for bilevel optimization ensures that the distributed machine learning model is obtained efficiently and with theoretical guarantees. A discussion of theoretical convergence results follows. The theoretical results provided herein are based on the following assumptions (A1-A4) on the properties of the loss functions in both the upper and lower-level optimization problems, which are mainly related to the continuity of the objective function and stochasticity of the gradient estimates:

A1. (Lipschitz continuity): assume that functions $f_i(\bullet)$, $\nabla f_i$ $(\bullet)$, $\nabla g_i(\bullet)$, $\nabla^2 g(\bullet)$, $\forall i$ are Lipschitz continuous with constants $L_{f,0}$, $L_{f,1}$, $L_{g,1}$, $L_{g,2}$ for both x and y.

A2. (Strong convexity of g $(\bullet)$ w.r.t. y): function $g(\bullet)$ is $\mu$-strongly convex w.r.t. y.

A3. (Connectivity of graph): the communication graph $\mathcal{G}$ is well connected, i.e., $1^T L = 0$ where $L = A^T A$, and the second smallest eigenvalue of L is strictly positive, i.e., $\tilde{\sigma}_{min}$ $(A^T A) > 0$.

A4. (Stochasticity of gradient estimate): the stochastic estimates $\nabla_{x_i} f_i(x_i, y_i; \xi)$, $\nabla_{y_i} g_i(x_i, y_i; \xi)$, $$\nabla^2_{y_i y_i} g_i(x_i, y_i; \zeta),$$

$\forall i$, are unbiased and their variances are bounded by $$\sigma_f^2, \sigma_{g,1}^2, \sigma_{g,2}^2.$$

Regarding convergence analysis of the present stochastic primal-dual decentralized algorithm for bilevel optimization, it can be first shown that the difference between two successive x—iterates is upper bounded in the order of $1/\alpha^2$ by the following lemma:

Lemma 1: under assumptions A1, A3, A4, suppose that iterates $\{x^r, \nabla_r\}$ are generated by Equation 5, above. Then, there exists a constant C such that $\mathbb{E}\|x^{r+1} - x^r\|^2 \leq C^2/\alpha^2, \forall r$, where C only depends on the constants defined in A1, A3, A4.

One can define $\mathcal{F}^r \triangleq \sigma\{y^0, x^0, \dots, x^r, y^{r+1}\}$ to be the filtration of the random variables up to iteration r where $\sigma\{\bullet\}$ denotes the $\sigma$-algebra generated by the random variables. Then, the changes of the Lagrangian $\mathcal{L}(x, \lambda) = n^{-1} 1^T f(x, y^*$ $(x)) + \langle \lambda, Ax \rangle$ can be quantified from point $(x^r, \lambda^r)$ to $(x^{r+1}, \lambda^{r+1})$ after one round of variable updates in the following lemma:

Lemma 2: under assumptions A1-A4, when $$\left\|\mathbb{E}[h_f^r | x^r, y^{r+1}] - \nabla_x f(x^r, y^{r+1})\right\| \leq b_r,$$

the sequence generated by the present stochastic primal-dual decentralized algorithm for bilevel optimization satisfies:

$$\mathbb{E}\left[\mathcal{L}\left(x^{r+1}, \lambda^{r+1}\right) \mid \mathcal{F}^r\right] - \mathcal{L}(x^r, \lambda^r) \le$$

$$-\frac{1}{2\alpha}\|\nabla \mathcal{L}(x^r, \lambda^r)\|^2 - \left(\frac{\alpha}{2} - \frac{L_{f,1}}{2}\right)\|\mathbb{E}\left[x^{r+1} - x^r\right]\|^2 +$$

$$\frac{2L_{f,1}^2}{n\alpha}\|y^{r+1} - y^*(x^r)\|^2 + \left(\frac{\sigma_{max}\left(A^T A\right)}{\alpha} + \frac{1}{\rho}\right)\mathbb{E}\|\lambda^{r+1} - \lambda^r\|^2 + \frac{2b_r^2}{n\alpha} + \frac{L_{f,1}\sigma_f^2}{2n\alpha^2},$$

where $\sigma_{max}(A^T A)$ denotes the maximum eigenvalue of $A^T A$.

Next, the successive difference of the primal variables and the distance from $y^r$ to the minimizer of the lower-level optimization problem at point $x^r$ are used to quantify the successive difference of the dual variables in the ascent part of the Lagrangian:

Lemma 3: under assumptions A1-A4, define $D \triangleq \alpha I - \rho A^T A$. Suppose that the sequence $\{x^r, y^r, \lambda^r\}$ is generated by the present stochastic primal-dual decentralized algorithm for bilevel optimization. Then, the following is obtained:

$$\frac{1}{\rho}\mathbb{E}\|\lambda^{r+1} - \lambda^r\|^2 \le \tag{6}$$

$$\frac{4L_{f,1}^2}{n^2 \rho \sigma_{min}\left(A^T A\right)}\mathbb{E}\|x^r - x^{r-1}\|^2 + \frac{4}{\rho \sigma_{min}\left(A^T A\right)}\|\mathbb{E}\left[\omega^{r+1}\right]\|_{D^T D}^2 +$$

$$\frac{8\beta^2 L_{f,1}^2 L_{g,1}^2}{\rho \sigma_{min}\left(A^T A\right)}\frac{\sigma_{g,1}^2}{n} + \frac{8\beta^2 L_{f,1}^2 L_{g,1}^2}{n^2 \rho \sigma_{min}\left(A^T A\right)}\mathbb{E}\|y^r - y^*(x^r)\|^2 + \frac{4(b_r + b_{r-1})^2}{\rho},$$

$$\text{where } \omega^{r+1} \triangleq \left(x^{r+1} - x^r\right) - \left(x^r - x^{r-1}\right).$$

Now, the ascent part measured by the successive difference of the dual variables is partially transferred to the term $\|\mathbb{E}\left[\omega^{r+1}\right]\|^2$. Using Equation 4 above, the following recursion can be constructed which establishes descent w.r.t. $\|\mathbb{E}\left[\omega^{r+1}\right]\|^2$:

Lemma 4: under assumptions A1-A4, suppose that the sequence is generated by the present stochastic primal-dual decentralized algorithm for bilevel optimization. Then, there exists a constant $\partial > 0$ such that $$Q^{r+1} - Q^r \le -\frac{1}{2}\|\mathbb{E}\left[\omega^{r+1}\right]\|_D^2 + \tag{7}$$

$$\frac{2L_{f,1}L_{g,1}^2\beta^2}{n^2}\mathbb{E}\|y^r - y^*(x^r)\|^2 + \left(\left(\frac{1}{2} + \frac{1}{n^2}\right)L_{f,1} + \frac{\alpha \partial}{4}\right)\|\mathbb{E}\left[x^{r+1} - x^r\right]\|^2 +$$

$$\left(2L_{g,1}^2\beta^2\sigma_{g,1}^2 + \frac{\sigma_f^2}{\alpha^2}\right)\frac{L_{f,1}}{n} + \frac{(b_r + b_{r-1})^2}{\alpha \partial},$$

$$\text{where } Q^r \triangleq \frac{\rho}{2}\|A\mathbb{E}\left[x^r\right]\|^2 + \frac{1}{2}\|\mathbb{E}\left[x^r - x^{r-1}\right]\|_D^2 + \frac{L_{f,1}}{n^2}\|x^r - x^{r-1}\|^2.$$

Combining the contraction property of the lower-level optimization update w.r.t. y shown in Lemma 3, the following descent lemma is obtained by applying Lemma 1-Lemma 4: Lemma 5: under assumptions A1-A4, suppose that sequence $\{x^r, y^r, \lambda^r, \forall r\}$ is generated by the present stochastic primal-dual decentralized algorithm for bilevel optimization. When $$\partial = \frac{1}{16}, c \triangleq \frac{16\sigma_{max}\left(A^T A\right)}{\kappa \sigma_{min}\left(A^T A\right)}, \kappa \triangleq \frac{\rho \sigma_{max}\left(A^T A\right)}{\alpha} < 1 \tag{8}$$

and the step-sizes satisfy $\alpha > \tilde{C}' L_{f,1}$ and $\tilde{C}''/\alpha < \beta \le 2/(\mu + L_{g,1})$, then there exist constants $C_1, C_2, C_3, C_4, C_5 > 0$ such that:

$$\mathcal{P}^{r+1} - \mathcal{P}^r \le -\frac{1}{2\alpha}\mathbb{E}\|\nabla \mathcal{L}(x^r, \lambda^r)\|^2 - C_1\|\mathbb{E}\left[x^{r+1} - x^r\right]\|^2 -$$

$$C\mathbb{E}\|y^r - y^*(x^r)\|^2 + C_3\frac{b_r^2 + b_{r-1}^2}{\alpha} + C_4\frac{\sigma_f^2}{n\alpha} + C_5\beta^2\frac{\sigma_{g,1}^2}{n},$$

where the potential/Lyapunov-like function is defined as:

$$\mathcal{P} \triangleq \mathbb{E}\left[\mathcal{L}(x^r, \lambda^r)\right] + \frac{c\rho}{2}\|A\mathbb{E}\left[x^r\right]\|^2 + \tag{9}$$

$$\frac{c}{2}\|\mathbb{E}\left[x^r - x^{r-1}\right]\|_D^2 + \frac{1}{n^2}\left(\frac{\sigma_{max}\left(A^T A\right)}{\alpha} + \frac{1}{\rho}\right)\frac{4L_{f,1}^2}{\sigma_{min}\left(A^T A\right)} + cL_{f,1}\right)$$

$$\mathbb{E}\|x^r - x^{r-1}\|^2 + \frac{1}{n^2}\mathbb{E}\|y^r - y^*(x^r)\|^2,$$

and the constants $\tilde{C}'$, $\tilde{C}''$ only depend on the parameters defined in A1-A4.

Regarding the theoretical convergence rate of the present stochastic primal-dual decentralized algorithm for bilevel optimization, from the above analysis it is known that the potential function $\mathcal{P}^r$ is monotonically decreasing up to some error. Combining the facts that $b_r, \forall r$ shrinks exponentially w.r.t. the mini-batch size of $$h_f^r$$

under a certain sampling scheme and that $\mathcal{P}'$ is lower bounded will immediately yield the following theoretical convergence rate guarantees.

Theorem 1: suppose that assumptions A1-A4 hold. When step-sizes are chosen as $\alpha \sim \mathcal{O}(\sqrt{T/n})$, $\beta \sim \mathcal{O}(\sqrt{n/T})$, the mini-batch size of $$h_f^r$$

is $\mathcal{O}(\log(T))$, $\rho/\alpha \sim \mathcal{O}(1)$, and $T \ge \mathcal{O}(n^4)$, then the iterates $$\{x_i^r, \lambda^r, y_i^r, \forall i, r\}$$

generated by the present stochastic primal-dual decentralized algorithm for bilevel optimization satisfy:

$$\frac{1}{T}\sum_{r=1}^{T}\mathbb{E}\left[\|\nabla \mathcal{L}(x^r, \lambda^r)\|^2\right] \sim \frac{1}{T}\sum_{r=1}^{T}\mathbb{E}\left[\|Ax^r\|^2\right] \sim O\left(1/\sqrt{nT}\right)$$

with $$T^{-1}\sum_{r=1}^{T}\mathbb{E}\left[\|y^r - y^*(x^r)\|^2\right] \to O\left(1/\sqrt{nT}\right),$$

where T denotes the total number of iterations.

It is notable that passing the limit of the sequence, one can get that the limit point $(x^*, y^*, \lambda^*)$ is an exact Karush-Kuhn- Tucker point of problem (1). It is also notable that Theorem 1 quantifies the number of iterations required to achieve the e-approximate Karush-Kuhn-Tucker points of (1) (including both the first-order stationarity of the solutions and the constraints violation) in an order of $1/(n \in {}^2)$. Therefore, it follows that a linear speedup w.r.t. the number of learners can be achieved by the present stochastic primal-dual decentralized algorithm for bilevel optimization. Note that the present stochastic primal-dual decentralized algorithm for bilevel optimization is a single timescale algorithm as the learning rates satisfy $1/\alpha - \sim \beta \sim \mathcal{O}(\sqrt{n/T})$.

The present techniques are now described by way of reference to the following non-limiting examples. In a first example, performance of the present stochastic primal-dual decentralized algorithm for bilevel optimization (SPDB) is compared to that of state-of-the-art decentralized training methods, i.e., decentralized parallel stochastic gradient descent (DSGD), gradient-tracking based nonconvex stochastic algorithm for decentralized optimization (GNSD), and a decentralized parallel stochastic gradient descent with variance reduction (SPD/D$^2$) on a decentralized classification learning problem using a dataset of images. The neural network for each agent has only one hidden layer with 32 neurons followed by sigmoid activation functions, where the weights at the last layer are used for adaptation and the rest of the weights must agree across the learners, and where there are 10 learners connected over a random Erdos-Renyi graph. The whole dataset was split such that in the ith agent 95% of the data samples have label i and the remaining samples are drawn randomly from the full dataset. The initial learning rate of all of the algorithms is 0:02, the mini-batch sizes for both $$h_f^i \text{ and } h_g^i,$$

are 16, and the ratio $\rho/\alpha$ in SPDB is 0:2.

Figure 7A:
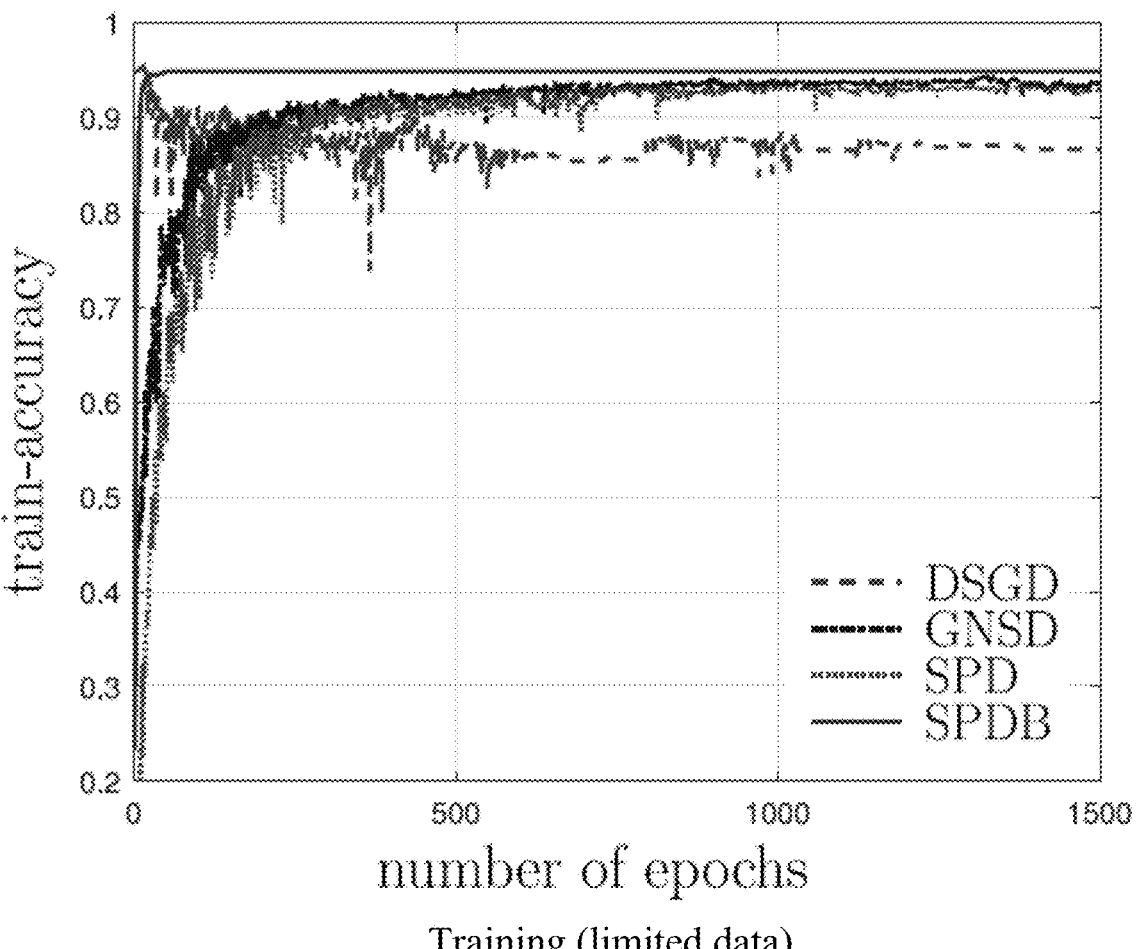
FIG. 7A is a diagram illustrating convergence performance of the present stochastic primal-dual decentralized algorithm for bilevel optimization during training in a limited data scenario according to an embodiment of the present invention.
Figure 7B:
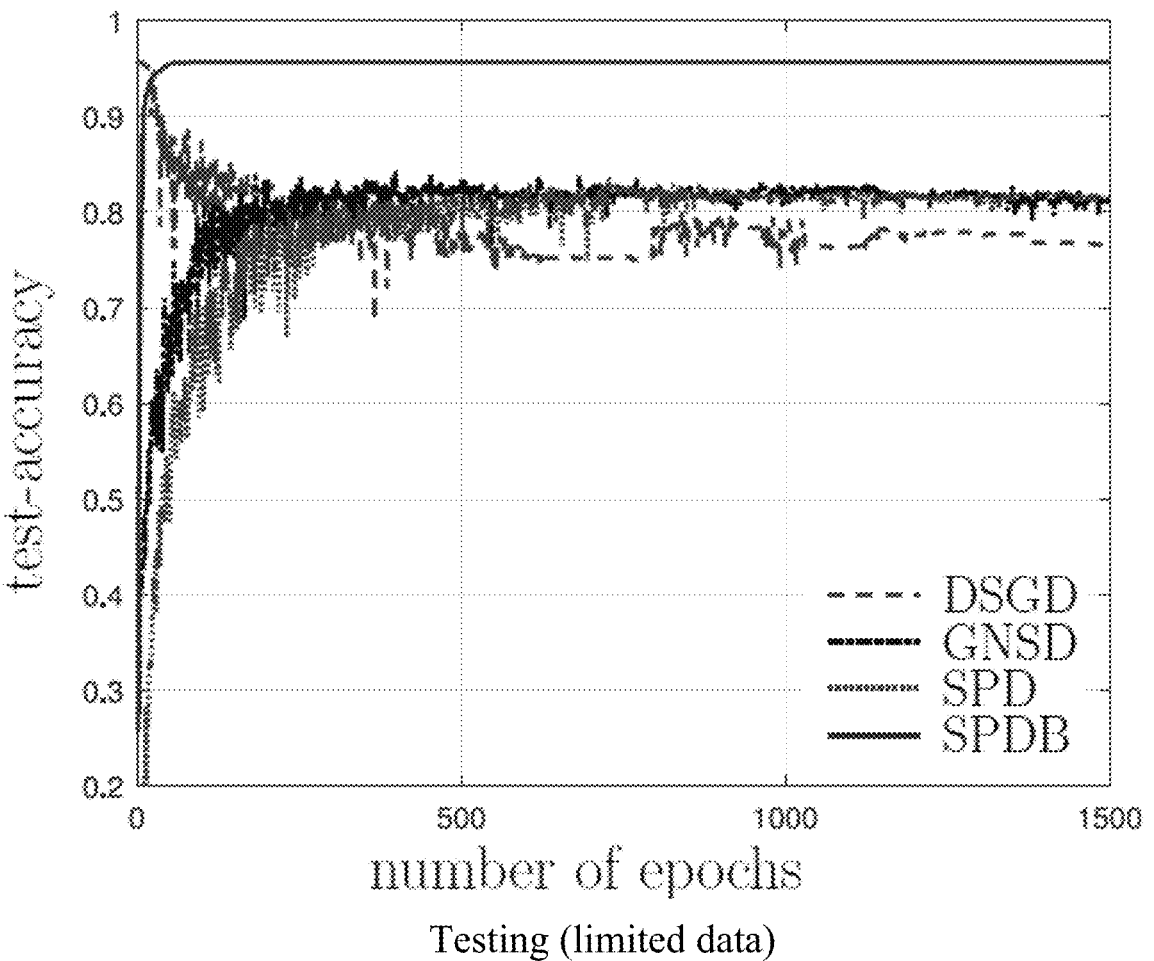
FIG. 7B is a diagram illustrating convergence performance of the present stochastic primal-dual decentralized algorithm for bilevel optimization during testing in a limited data scenario according to an embodiment of the present invention.
Figure 7C:
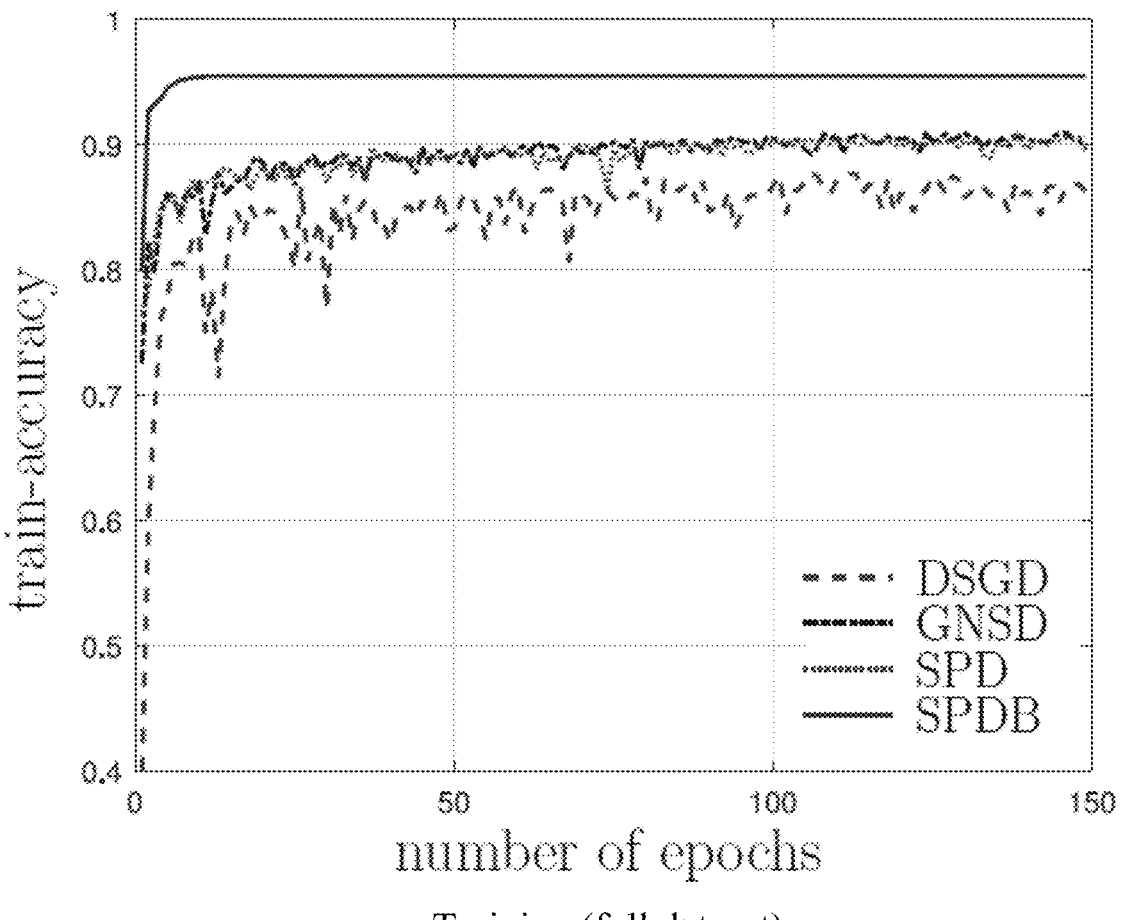
FIG. 7C is a diagram illustrating convergence performance of the present stochastic primal-dual decentralized algorithm for bilevel optimization when a full training dataset is used during training according to an embodiment of the present invention.
Figure 7D:
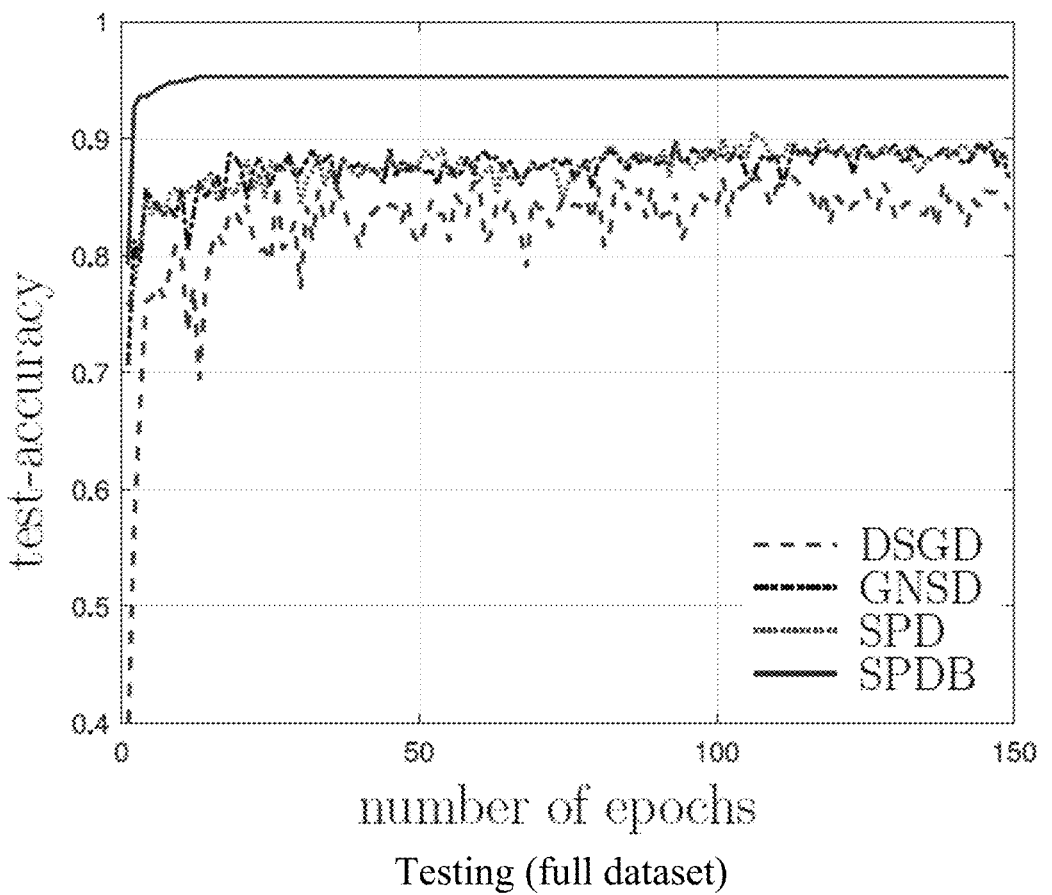
FIG. 7D is a diagram illustrating convergence performance of the present stochastic primal-dual decentralized algorithm for bilevel optimization when the full training dataset is used during testing according to an embodiment of the present invention.

As shown in FIG. 7A (training) and FIG. 7B (testing), only 128 training data samples at each learner are chosen to create a limited data scenario. By contrast, in FIG. 7C (training) and FIG. 7D (testing), the full training dataset was used. From the results shown in FIGS. 7A-D, it can be readily observed that SPDB achieves the best training and testing accuracy with a fast convergence rate, showing the merits of SPDB in terms of both training speedup over multiple learners and personalized adaptation at each node.

In another example, experiments were also conducted on decentralized training of acoustic models for automatic speech recognition (ASR). There were 50 hours of wideband speech data from five different sources, with each source contributing 10 hours of speech. In these experiments, there were five learners, each with access to only one data source, which gave rise to heterogeneous data distributions across learners. In addition to the 10 hours of training data, each learner also had about 2 hours of speech used as a heldout set.

The acoustic model used was a bi-directional Long Short-Term Memory (BLSTM) based deep neural network-hidden Markov model (DNN-HMM) containing 5 bidirectional LSTM layers with 256 cells per layer per direction. There was a linear projection layer of 256 hidden units between the topmost BLSTM layer and the softmax output layer. There were 9,300 output units in the softmax output layer corresponding to context-dependent HMM states. The LSTM was unrolled over 21 frames and trained with non-overlapping feature subsequences of that length. The dimensionality of the input features was 120 which was a 40-dim logmel and its A and $\Delta^2$ coefficients. Therefore, a batch of size M consisted of M 21-frame subsequences and the corresponding tensor was of size M×120×21. A learner-specific 121× 120 affine transform layer was used to transform the input features prior to the first layer of the LSTM. It was initialized to an identity matrix and zero bias vector. The decoding vocabulary included 260K words and the language model (LM) was a 4-gram LM with 200 M n-grams and modified Kneser-Ney smoothing built using publicly available training data from a broad variety of sources.

Training minimized cross-entropy loss on 5 K80 GPUs using stochastic gradient descent (SGD) without momentum. The communication graph among learners was a ring. In each iteration, every learner only communicated with its left and right neighbors. The initial learning rate was 1.0, it was annealed by $1/\sqrt{2}$ after the 20th epoch, and training finished in 30 epochs. The batch size was 256 21-frame subsequences.

Figure 8A:
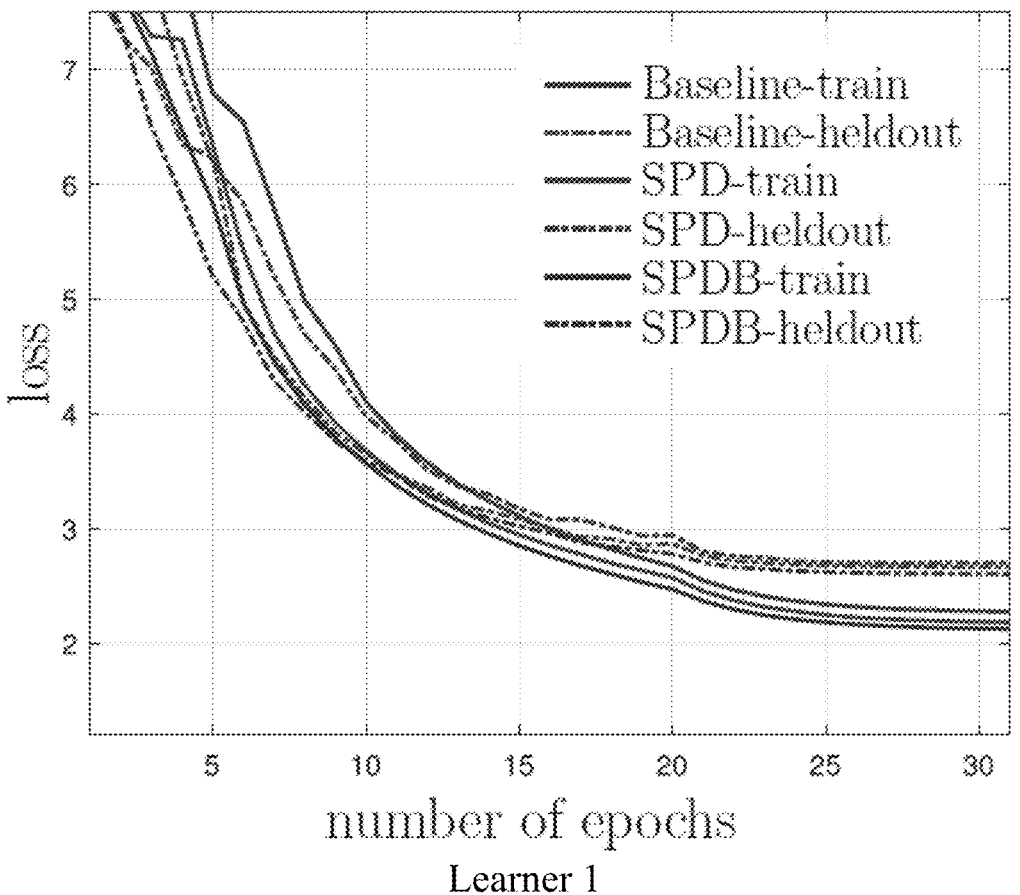
FIG. 8A is a diagram illustrating convergence performance of the present stochastic primal-dual decentralized algorithm for bilevel optimization in training of acoustic models for a learner in the distributed machine learning network according to an embodiment of the present invention.
Figures 8B, 9:
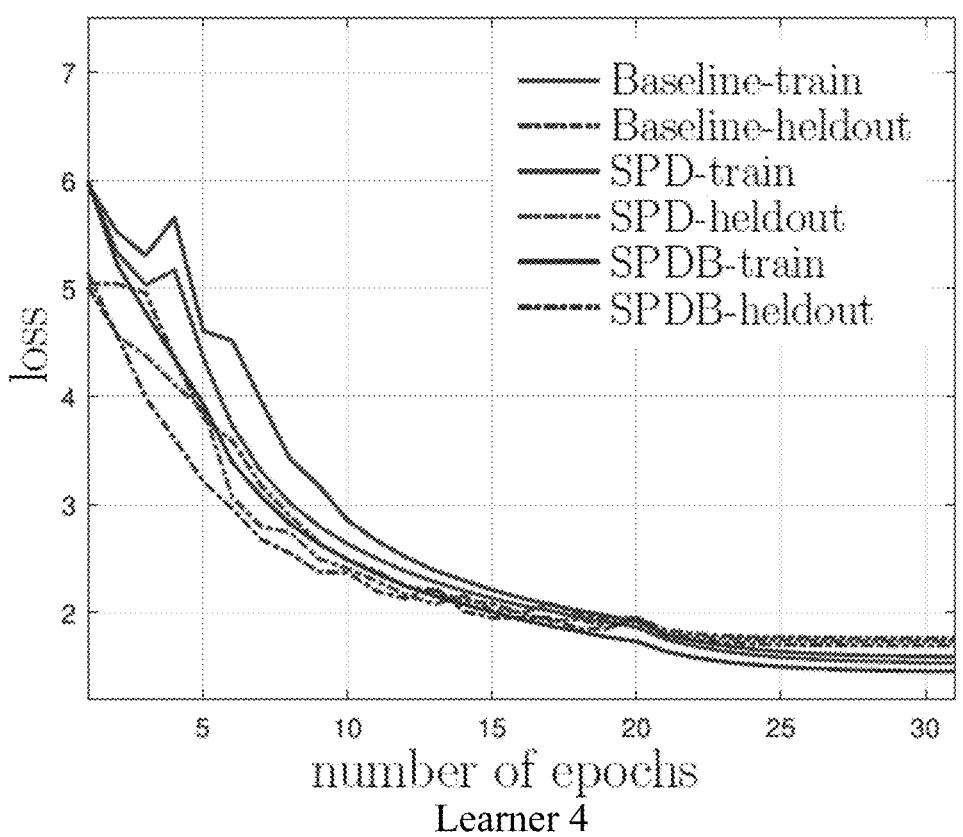
FIG. 8B is a diagram illustrating convergence performance of the present stochastic primal-dual decentralized algorithm for bilevel optimization in training of acoustic models for another learner in the distributed machine learning network according to an embodiment of the present invention.
FIG. 9 is a diagram illustrating word error rates of four test sets according to an embodiment of the present invention.

In personalized client learning, the affine transform layer was optimized locally. In each iteration, the local transform was first optimized by one-step SGD. Then, the remaining model parameters were averaged between left and right neighbors and updated by one-step SGD. For optimization of the local transform (i.e., the bottom layer of the model), the initial learning rate was 0:02 and it was annealed by $1/\sqrt{2}$ after the 20th epoch, same as the model learning rate schedule. No momentum was used. For illustrative purposes only, plots of the training and heldout losses for two of the learners, arbitrarily learner 1 and learner 4, are shown in FIG. 8A and FIG. 8B, respectively. A comparison of the word error rates (WER) on the four test sets (S1-S4) is shown in FIG. 9.

As will be described below, the present techniques can optionally be provided as a service in a cloud environment. For instance, by way of example only, one or more steps of methodology 300 of FIG. 3 and/or one or more steps of methodology 400 of FIG. 4 can be performed on a dedicated cloud server.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 10, computing environment 100 contains an example of an environment for the execution of at least some of the computer code involved in performing the inventive methods, such as decentralized bilevel optimization for personalized learning over a heterogenous network code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 10. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A decentralized learning system, comprising:
   a distributed machine learning network with multiple nodes at multiple networked computers, and datasets associated with the nodes which have a plurality of heterogeneous data distributions; and
   a bilevel learning structure at each of the nodes for optimizing one or more features from each of the datasets using a decentralized bilevel optimization solver, while maintaining distinct features from each of the datasets; wherein the bilevel learning structure at each of the nodes comprises:
      an upper-level learning structure for extracting a permutation invariant latent space, wherein the heterogeneous data distributions are represented as a plurality of homogenous data distributions, and wherein the extracting uses a transform function:

$$T_i^*(w_i; \xi) = \arg\min_{M_i} l(w_i, M_i(\xi)), \xi \Box D_i; \text{ and}$$

a lower-level learning structure for adapting the heterogeneous data distributions to the permutation invariant latent space.

2. The decentralized learning system of claim 1, wherein a distinct feature comprises a feature that is unique to a dataset at a particular one of the nodes, as compared to a rest of the nodes.

3. The decentralized learning system of claim 1, wherein the datasets have data distributions that are different amongst neighboring nodes.

4. The decentralized learning system of claim 1, wherein the decentralized bilevel optimization solver is formulated as:

$$\min_{x \in \Box^n} \frac{1}{n} \sum_{i=1}^{n} E_{\xi \in D_i^{(u)}} [f_i(x_i, y_i^*(x_i); \xi)]$$

$$\text{s.t. } Ax = 0, y_i^*(x_i) = \arg\min_{y_i \in \Box^m} E_{\zeta \in D_i^{(l)}} [g_i(x_i, y_i; \zeta)],$$

$$\text{wherein } f_i(x_i, y_i^*(x_i)) \Box E_{\xi \in D_i^{(u)}} f_i(x_i, y_i^*(x_i); \xi)$$

is a smooth loss function, $D_i^{(u)}$ denotes local data distributions at an upper level of the decentralized bilevel optimization solver, $D_i^{(l)}$ denotes local data distributions at a lower level of the decentralized bilevel optimization solver, $g_i(\bullet)$ denotes a lower-level loss function at node i, $x \Box [x_1, \ldots, x_n]^T$, and $A \in | |^{|E| \times n}$ represents an incidence matrix.

5. The decentralized learning system of claim 1, wherein the upper-level learning structure comprises a global consensus model implemented at each of the nodes.

6. The decentralized learning system of claim 1, wherein the lower-level learning structure comprises an individual learning model implemented at each of the nodes.

7. A method for decentralized learning, the method comprising:
   accessing datasets associated with nodes which have a plurality of heterogeneous data distributions in a distributed machine learning network at multiple networked computers;
   optimizing one or more features from each of the datasets using a decentralized bilevel optimization solver, wherein distinct features from each of the datasets are maintained during the optimizing, wherein the optimizing further comprises:
      extracting, in an upper level of the decentralized bilevel optimization solver, a permutation invariant latent space wherein the heterogeneous data distributions are represented as a plurality of homogenous data distributions, and wherein the extracting uses a transform function:

$$T_i^*(w_i; \xi) = \arg\min_{M_i} l(w_i, M_i(\xi)), \xi \cdot D_i; \text{ and}$$

adapting, in a lower level of the decentralized bilevel optimization solver, the heterogeneous data distributions to the permutation invariant latent space; and
   training a distributed machine learning model using each of the datasets which includes the one or more features that have been optimized.

8. The method of claim 7, wherein the optimizing is performed at each of the nodes using the decentralized bilevel optimization solver.

9. The method of claim 7, wherein a distinct feature comprises a feature that is unique to a dataset at a particular one of the nodes, as compared to a rest of the nodes.

10. The method of claim 7, wherein the datasets have data distributions that are different amongst neighboring nodes.

11. The method of claim 7, wherein the decentralized bilevel optimization solver is formulated as:

$$\min_{x \in \Box^n} \frac{1}{n} \sum_{i=1}^{n} E_{\xi \in D_i^{(u)}} [f_i(x_i, y_i^*(x_i); \xi)]$$

$$\text{s.t. } Ax = 0, y_i^*(x_i) = \arg\min_{y_i \in \Box^m} E_{\zeta \in D_i^{(l)}} [g_i(x_i, y_i; \zeta)],$$

$$\text{wherein } f_i(x_i, y_i^*(x_i)) \Box E_{\xi \in D_i^{(u)}} f_i(x_i, y_i^*(x_i); \xi)$$

is a smooth loss function, $D_i^{(u)}$ denotes local data distributions at the upper level of the decentralized bilevel optimization solver, $D_i^{(l)}$ denotes local data distributions at the lower level of the decentralized bilevel optimization solver, $g_i(\bullet)$ denotes a lower-level loss function at node i, $x \Box [x_1, \ldots, x_n]^T$, and $A \in \Box^{|E| \times n}$ represents an incidence matrix.

12. A computer program product for decentralized learning, the computer program product comprising a computer readable storage medium having program instructions embodied therewith, the program instructions executable by a computer to cause the computer to perform:

accessing datasets associated with nodes which have a plurality of heterogeneous data distributions in a distributed machine learning network at multiple networked computers;

optimizing one or more features from each of the datasets using a decentralized bilevel optimization solver, wherein distinct features from each of the datasets are maintained during the optimizing, wherein the optimizing further comprises:

extracting, in an upper level of the decentralized bilevel optimization solver, a permutation invariant latent space wherein the heterogeneous data distributions are represented as a plurality of homogenous data distributions, and wherein the extracting uses a transform function:

$$T_i^*(w_i; \xi) = \arg\min_{M_i} l(w_i, M_i(\xi)), \; \xi \Box D_i; \text{ and}$$

adapting, in a lower level of the decentralized bilevel optimization solver, the heterogeneous data distributions to the permutation invariant latent space; and training a distributed machine learning model using each of the datasets which includes the one or more features that have been optimized.

13. The computer program product of claim 12, wherein the decentralized bilevel optimization solver is formulated as:

$$\min_{x \in \Box^n} \frac{1}{n} \sum_{i=1}^n E_{\xi \in D_i^{(u)}} [f_i(x_i, y_i^*(x_i); \xi)]$$

$$\text{s.t. } Ax = 0, \; y_i^*(x_i) = \arg\min_{y_i \in \Box^m} E_{\zeta \in D_i^{(l)}} [g_i(x_i, y_i; \zeta)],$$

$$\text{wherein } f_i(x_i, y_i^*(x_i)) \Box E_{\xi \in D_i^{(u)}} f_i(x_i, y_i^*(x_i); \xi)$$

is a smooth loss function, $D_i^{(u)}$ denotes local data distributions at the upper level of the decentralized bilevel optimization solver, $D_i^{(l)}$ denotes local data distributions at the lower level of the decentralized bilevel optimization solver, $g_i(\bullet)$ denotes a lower-level loss function at node i, $x \; [x_1, \ldots, x_n]^T$, and $A \in \Box^{|E| \times n}$ represents an incidence matrix.

\* \* \* \* \*